May 30, 1950 J. G. APEL 2,509,665
CLOSURE MEANS FOR VEHICLE BODIES
Filed June 30, 1947 3 Sheets-Sheet 1
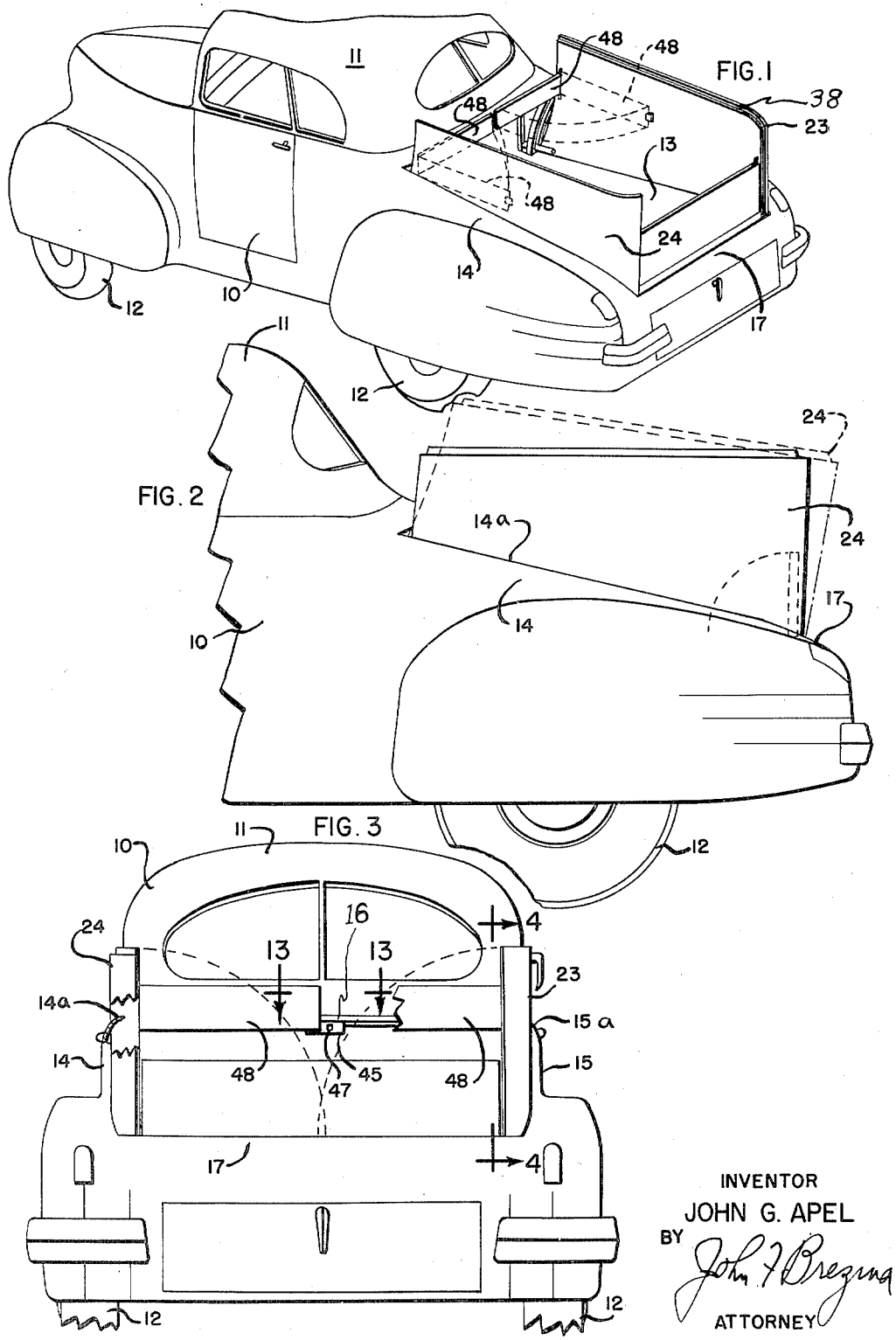
INVENTOR
JOHN G. APEL
BY
John F Brezina
ATTORNEY

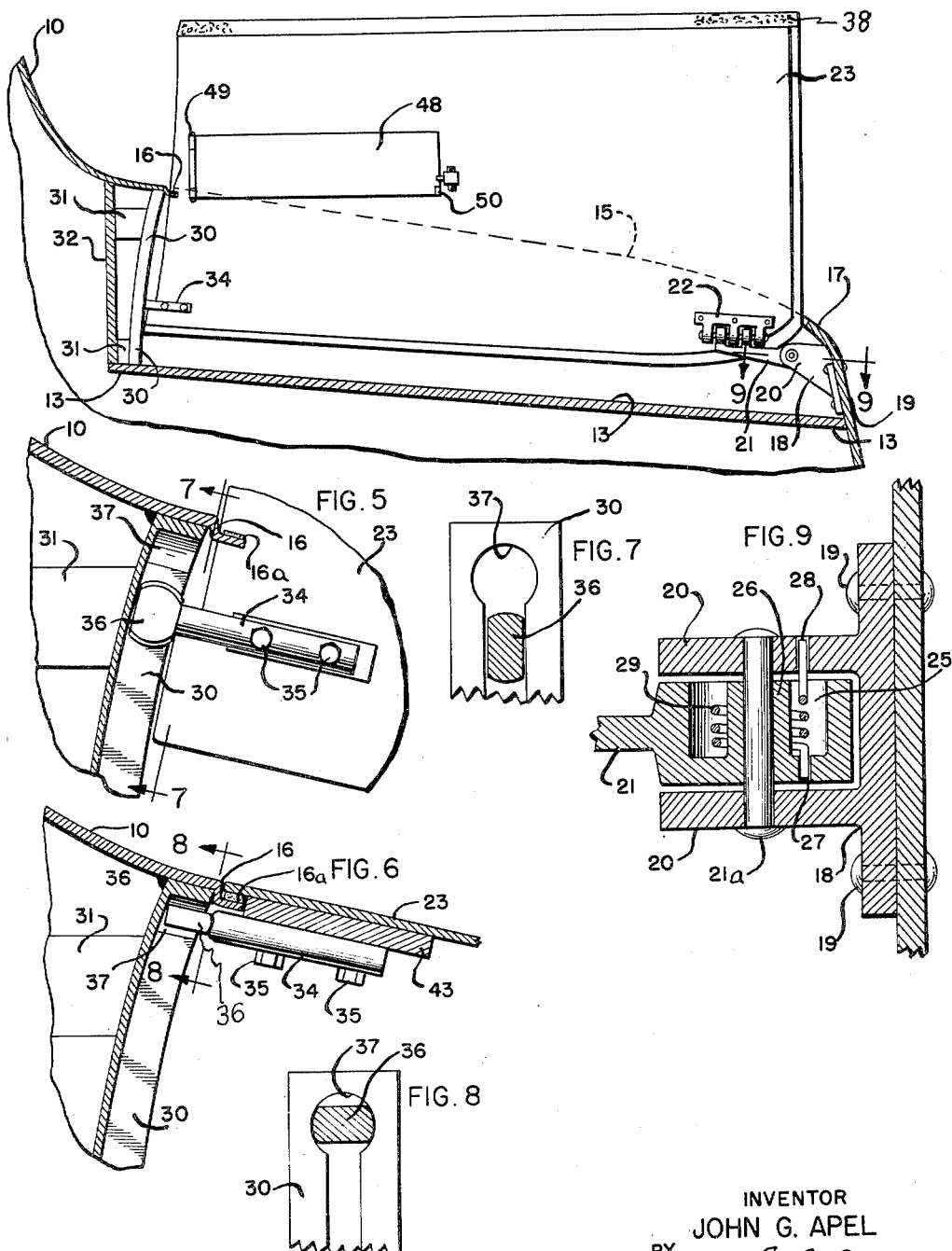

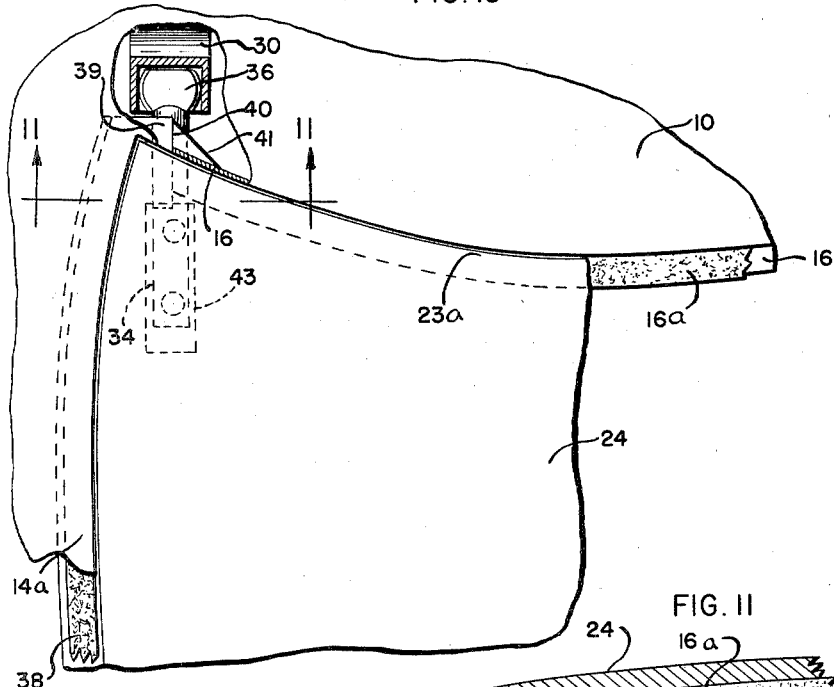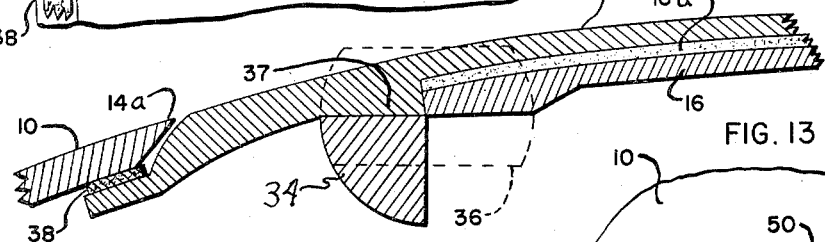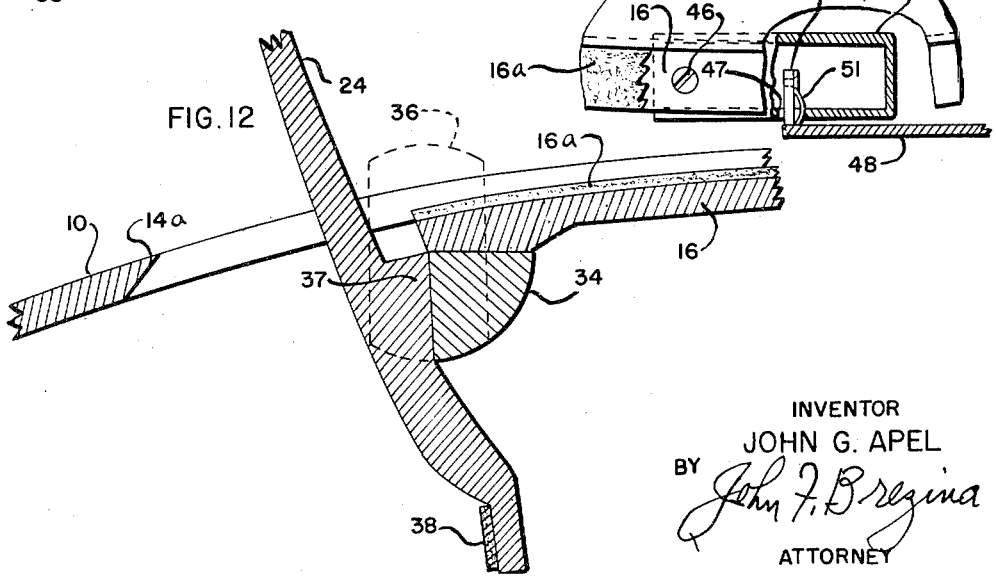

Patented May 30, 1950

2,509,665

UNITED STATES PATENT OFFICE 2,509,665

CLOSURE MEANS FOR VEHICLE BODIES

John G. Apel, Chicago, Ill.

Application June 30, 1947, Serial No. 758,190

11 Claims. (Cl. 296—37)

This invention relates to body construction for vehicles and novel closure means therefor.

It is an object of my invention to provide novel vehicle body constructions and a novel means of mounting closure doors on the rear portion of the vehicle body, for example, on a single seated vehicle which normally has a relatively large elongated so-called luggage compartment rearwardly of the main seat. My novel means includes the provision of two closure doors for the rear compartment of the vehicle body, each of which doors are normally hingedly mounted at the rear end portion thereof so as to both close toward each other and also so as to be raised, elevated and lowered in a substantially vertical plane when opened, and when closed to bring the plane of each door into alignment with the curved outer surface of the vehicle body.

One of the objectional features of trunks today in a single seated auto body from the standpoint of the person who desires to use the same frequently for hauling of a substantial amount of articles, frequently heavy and bulky articles, is that a normal rear trunk door which is behind a single seat has to be raised up and held in an uppermost position by known brackets so that the rear view of the driver is normally obstructed, and also the opening over the rear floor of the luggage compartment is limited and obstructed thereby preventing the hauling of larger articles such as the larger type of household appliances, tools, machines used by tradesmen and materials of bulky character. It is therefore, one of the primary objects of my invention to provide means for mounting two separate doors for the rear trunk opening each of which will open to its respective side and leave the space between the open door and above the floor area of the trunk compartment completely open and unobstructed upwardly. My invention accomplishes this purpose without eliminating the normal streamline effect and curvature of the outside of the vehicle body, that is, when the doors are closed and the vehicle is used for passenger and normal pleasure purposes.

A further object of my invention is the provision of a novel body construction in which a rear trunk opening is closable by a pair of side opening doors which have their front end portions slidably mounted in guide tracks at each side of the vehicle body to provide for vertical arcuate movement of the front portions of the doors when the same are moved toward closing position, and also means providing for the lower edge portions of the two doors when opened to rest adjacent or upon the floor of the trunk compartment, to thereby guard the permanent side portions of the body defining the trunk opening as well as to act as retaining wall for the goods, merchandise or articles placed into the trunk compartment.

A further object of my invention is a provision of two pivotally mounted and vertically movable side opening doors or closures for the rear trunk compartment of a vehicle body which are provided with pivotal braces acting as guards and which are adapted to lock and hold the doors in open condition and at the same time guard the permanent portions of the vehicle body against damage from merchandise and other articles hauled in the trunk compartment.

A further object is the provision of a novel body construction for vehicles having trunk compartments, and having a pair of side opening closure doors pivoted with respect thereto, and which have a novel sealing means between the peripheral edges of the closures and the engaging edges of the vehicle body which define the trunk opening.

Other and further important objects of my invention will be apparent from the following description and appended claims.

This invention (in a preferred form) is illustrated in the accompanying drawings having numerals of reference thereon, referred to in the following specification.

Fig. 1 is a perspective view of a one seat vehicle body and showing the two side opening closure doors in open position, with parts embodying my invention.

Fig. 2 is an enlarged elevational view of the rear end portion of the vehicle body showing the outer face of one of the side opening doors in elevation in full lines, and showing in dotted lines the upper position of such door and into which such door is placed before closing movement thereof.

Fig. 3 is the rear end view of a vehicle showing my closure doors in open position, and with part of one of the braces broken away.

Fig. 4 is an enlarged front sectional view taken on a plane longitudinally of the vehicle body and illustrating the inside face of one of the doors in open position and showing in elevation the mounting means therefor and the vertical guideway member at the forward end portion of the trunk compartment.

Fig. 5 is an enlarged cross-sectional view taken on a plane longitudinally of the rear portion of the vehicle body and at the area about the forward portion of the juncture of the closure doors and the vehicle body, and illustrating the pivoting and mounting means and guide-tracks for guiding the door in a substantially vertical arcuate movement.

Fig. 6 is a similar cross-sectional view.

Fig. 7 is an enlarged cross-sectional view taken on the plane indicated by line 7—7 of Fig. 5.

Fig. 8 is an enlarged cross-sectional view taken on the plane indicated by line 8—8 of Fig. 6.

Fig. 9 is an enlarged cross-sectional view of the pivoting and hinging means illustrating the mounting of the rear portion of each of the doors.

Fig. 10 is a top view looking at a left rear segment of the body and one of the doors, and having parts broken away and illustrating part of the joints and sealing means between the door and body parts.

Fig. 11 is an enlarged cross section taken substantially on a vertical plane indicated by line 11—11 of Fig. 10 and looking toward the front and with the door in closed position.

Fig. 12 is a cross sectional view taken on a plane indicated by line 11—11 of Fig. 10 and illustrating a segment of the door in open position.

Fig. 13 is a partially cross sectional view taken on line 13—13 of Fig. 3.

Referring to Figs. 1, 2 and 3, reference numeral 10 designates a vehicle or automobile body having a conventional top 11, and conventional wheels 12 being illustrated. This vehicle body has an elongated rear so-called trunk compartment which has a floor 13 and which is partially defined at its side by body side portions 14 and 15 respectively whose upper edge portions are gradually inclined downwardly in a rear direction and are a continuity of the streamlined shape of the main portion of the body, as illustrated in Figs. 1 and 2. The edge or flange of the body shell at the front portion of the rear trunk opening is preferably offset as shown in Fig. 6, is designated by reference numeral 16, as illustrated in Fig. 6. The seal-carrying flange portions are designated by reference numerals 14a and 15a respectively. The portion of the body shell or metal panel at the extreme rear end of the vehicle body is designated by reference numeral 17, same being borne upon Figs. 1, 3, and 4 respectively.

Referring to the right hand end portion of Fig. 4, and to Fig. 9, numeral 18 designates a bifurcated metal bracket whose integral base flanges are apertured and are secured by suitable rivets 19, preferably 4 in number, to the inside face of the rear body panel 17, as indicated in Fig. 4. The integral inwardly extending arms 20 of (18) have aligned apertures therein, and the rear end portion of a pivoting arm or lever 21 is pivotally and hingedly mounted between said arms 20 by suitable pin or rivet 21a.

The forwardly or inwardly extending portion of the arm 21 has a pair of spaced apart integral apertured knuckles which interfit and are normally disposed between spaced apart knuckles of a hinged butt 22, which hinged butt 22 has a plurality of spaced apertures therein through which extend suitable rivets which also extend into the edge portion of each closure door, as indicated in Fig. 4. The two closure doors are generally designated by reference numerals 23 and 24 respectively. Such closure doors are of such a shape and size so that when they are closed together in the manner hereinafter described they will effectively seal and close the openings of the rear luggage compartment in the described manner.

As shown in cross section in Fig. 9, each of the arms 21 has an annular side opening recess 25 therein which defines the central hub portion 26. Each of said arms has an opening or recess 27 as shown in Fig. 9, and one end of the arms 20 has an opening or passage 28. A relatively stiff metal coil spring 29 is mounted about the hub portion 26 and has one end thereof secured or mounted in the aperture or passage 28 of arm 20 and its opposite angularly bent end is seated in the aperture 27. This spring 20 is mounted under tension and in such a manner that its normal tendency when in mounted position will be to assist the upward pivoting movement or the upward movement of the arm 21 and thereby assist upward pivoting movement of the door to which the said hinge is attached.

As shown at the left hand portion of Figs. 4, 5, and 6 respectively, a channel-like arcuate guide track or guide member 30 is mounted in a substantially downwardly extending position between the rear edge of the body portion 16 and the floor 13 of the trunk compartment. In Figs. 5 and 6 said guide track is shown in vertical section. There are two such guide tracks, one at each side of the compartment. Each of said guide tracks is of U-shaped cross section or channeled and having a groove or guide opening rearwardly or into the luggage compartment. Said guide-tracks are secured in the position illustrated in Fig. 4 by suitable screws or bolts not shown, and also by metal straps or brackets 31 which have their opposite ends suitably secured at spaced apart points on a vertical bar or supporting member 32.

Said guide tracks may be either channeled or provided with a longitudinal tensional slot, for example as illustrated.

As indicated in Figs. 4, 5, and 6 respectively, each of the said closure doors 23 and 24 on its corner and edge portion carries a stub shaft, arm or spindle 34, each of which is suitably apertured and secured by bolts 35 to the inside face of the doors 23 and 24 respectively. Each of said stub shafts or arms has an integral enlarged forwardly projecting head 36 which has two opposite parallel faces in planes approximately parallel to the door. The other two side faces of said projecting pivoting studs are preferably curved, as indicated in Fig. 8.

As illustrated in Figs. 5, 6, and 8 respectively, the upper end portion of the slot or channel in each of the guide tracks 30 terminates in a substantially round enlarged recess 37. The narrower dimension of the enlarged end stud 36 of each of the stud shafts 34 is less than the inside width of each of the guide tracks 30 so that when the doors are pivoted to substantially a vertical plane the forward portion of the doors will slide and pivot in a downward direction until said stud reaches nearly the bottom end portion of the guide track in each instance. The lower position of one of said doors is illustrated in Fig. 4.

A cross section of a fragment of the left hand door, looking in a forward direction, is illustrated in Fig. 12. It will be noted that each of said doors preferably is provided with a bead or longitudinally extending flange or shoulder 37 which is so located that the shoulder thereof will be adapted to engage the edge or end space of the flange 16 and gasket 16a which is suitably secured on said flange 16. Said closed and sealed position of the left hand door is illustrated in cross section in Fig. 11.

As illustrated in the cross sectional views of Figs. 11 and 12, the normally outer edge portion of each of said doors 23 and 24 is preferably slightly offset and has mounted thereon, for example by a suitable adhesive or cement, a sealing or strip gasket 38, which when said doors are closed, is adapted to impinge and engage the underface of the extreme edge portion of the body side portions 14a and 15a respectively, which partially define the rear trunk compartment.

As indicated in the enlarged fragmentary top view of Fig. 10, it will be noted that each of said doors at its outer edge portion has an integral extension 39 which extends substantially over the forward portion of the stub shaft respectively and so as to close a forward recessed corner portion of the trunk opening. Each of said extensions 39 has a substantially straight forwardly and rearwardly extending edge designated as 40, and in order to effectively seal the joints or cracks between such edge face 40 and extensions 39 I preferably mount a relatively short metal plate 41, preferably by welding or the like, upon the under side and face of the rear edge portions of the body which terminates in the offset seal-carrying flange 16. Said plate is designated by reference numeral 41.

It will be noted, for example from Fig. 10 and also Figs. 5 and 6, that the offset rearwardly extending flange 16 has suitably bonded or secured thereon a suitable sealing gasket 16a which extends from one end to the other of said flange 16.

As illustrated partially in Fig. 13, which is the top plan view of the rear portion of the body at the front of the trunk compartment, a suitable metal bracket 45 of angular cross-section is secured upon the inner face or underside of the rearwardly extending flange 16. Said securance is preferably by means of bolts or the like 46. The rearward face and portion of said bracket 45 coincides substantially with the rear edge of the flange 16 and has a pair of spaced apart slots or openings 47 therein, one of which is illustrated in Fig. 13.

Each of said doors has secured to the inner face of its forward portion a plate, arm or lever 48 shown in plan view in Fig. 4, such securance being by a hinge connection 49 suitably secured to the inside face of each of said doors. The free end of each of said arms or guard plates 48 carries a perpendicularly extending stud 50, on the inner face of which stud or extension 50 is secured by a curved metal leaf spring 51, which is of such a size and position so that when said guard plates and arms 48 are swung in a forward direction the spring 51 as well as the stud 50 will enter the slot 47 at that side of said bracket 45 and spring 51 will frictionally engage that edge of the lock 45 nearest the door to which the swing guard plate or arm 48 is connected.

Said arms 48 are preferably of relatively wide dimension and so positioned that when swung into position the same will protect and guard the flange 16 of the body against impact and damage from materials and objects being hauled in said compartment.

As many changes could be made in the above construction, and many apparently widely different embodiments of my invention, within the scope of the claims, constructed without departing from the spirit or scope thereof, it is intended that all matter contained in the accompanying specification shall be interpreted as illustrative and not in a limiting sense.

I claim:

1. In a vehicle body having a rear openable compartment, a pair of doors openable upwardly and toward the body sides respectively; a compound hinge pivotally and hingedly connecting the rear end portion of each of said doors with the rear end of the vehicle body and providing for vertical arcuate movement of the front portions of said doors; a pair of elongated arcuately extending guide members secured on said body at the front edge portions of said doors respectively, said guide tracks providing for movement of said doors in a predetermined path; a projecting arm on each of said doors, each of said arms at one end thereof being pivotable and slidable in one of said guide members respectively, said projecting arms continually engaging in said guide members during opening and closing of said doors, and releasable means for locking said doors in open upwardly extending positions.

2. In a construction for vehicle bodies having an upwardly openable rear compartment, a pair of inwardly extending spaced apart brackets secured on the rear end of said body; an arm pivoted to each of said brackets and extending forwardly, a pair of upwardly openable doors adapted to close the said rear compartment opening; a second bracket secured on each of said doors and pivotally connected to the free end of each of said arms respectively, said doors being movable in an upward and downward direction with respect to the vehicle body; a pair of guide tracks mounted in said body and extending upwardly and disposed substantially adjacent the forward edges of said doors respectively; an arm secured on the forward portion of each of said doors and projecting forwardly, each of said last mentioned arms having its end pivotally and slidably mounted in one of said guide tracks respectively whereby the elevating and downward movements of said doors will be controlled; said doors being adapted to descend into the body compartment when opened and being adapted to be raised before closing thereof into adjacent cooperating positions, and arms pivoted on the inside of the front portions of said doors and adapted when extended, to brace said doors in open positions.

3. In a construction for vehicle bodies having an upwardly openable rear compartment, inwardly extending spaced apart brackets on the rear end of said body; an arm pivoted to each of said brackets and extending into said compartment, a pair of upwardly openable doors adapted to close the said compartment opening; brackets secured on and pivotally connecting said doors respectively and said arms, said doors being movable in an upward and downward direction with respect to the vehicle body; a pair of guide tracks mounted in said body and in the forward part of said rear compartment; a pivoting arm secured on the forward portion of each of said doors and having one end projecting into and pivotable and slidable in said guide tracks respectively whereby the pivoting, elevating and downward movements of said doors when open will be controlled; said doors being adapted to descend into the body compartment when opened and being adapted to be raised before closing thereof into adjacent cooperating positions, and releasable pivoted means on the inside of said doors and adapted, when extended, to brace said doors in open positions.

4. In a construction for vehicle bodies having an upwardly openable rear compartment, a pair of inwardly extending spaced apart brackets secured on the rear portion of said body; an arm pivoted to each of said brackets and extending forwardly, a pair of upwardly openable doors adapted to be closed together to close the said compartment opening; a bracket secured on each of said doors and pivotally connected to the free end of said arms respectively, means for moving said doors upwardly and downwardly including a pair of guide tracks mounted in said body and disposed substantially adjacent the forward edges of said doors respectively; and pivoting arms secured on the forward portions of said doors respectively and having their end portions slidably mounted in said guide tracks respectively whereby said doors will be guided in elevating and downward movements, and projecting elements on said pivoting arms providing for holding said doors in open positions except when moved into extreme upper positions; said doors being movable into the body compartment when opened and being adapted to be raised before closing thereof into adjacent cooperating positions.

5. A construction for mounting the closure doors of a vehicle body compartment as recited in claim 4 and having spring means connected to said brackets adapted to aid in raising said doors respectively, and having sealing members upon the coinciding edges of said doors and of said body.

6. In means for mounting the closure door of a vehicle body compartment or the like so as to provide for upwardly and downwardly shifting one free end of the door and hingedly pivoting the door into closed or open position; a panel-like door; a stationary bracket; an arm pivotable in said bracket; a hinge connection between said arm and said door; the opposite end of said door being free to move upwardly and downwardly; an elongated guide track mounted adjacent the free end of said door; and a projecting arm on said door slidable in said track to provide for movement of said door in a predetermined path, said projecting arm continually engaging in said track during opening and closing movement of said door.

7. A mounting means for a closure as recited in claim 6 and having an elongated brace pivoted at one end thereof to the interior face of said door, and means on the body adapted to releasably anchor said brace in an extended position to thereby keep said door from undesirable movement.

8. A closure mounting means as recited in claim 6 wherein said closure door has sealing elements on its periphery for engagement with the body portion defining an opening, and having projections on said second mentioned arm engaging in said track to prevent closing arcuate movement of said door in all positions except when in its maximum upper position.

9. In combination with a vehicle body having an upward opening; a pair of closure doors for closing said opening; a compound pivoted hinge having one portion secured to said body and another portion secured to one end of each of said doors whereby said doors are movable in a substantially vertical plane as well as arcuately swingable into adjacent closed position; a guide track secured forwardly of the front portions of each of said doors; projecting elements secured on said doors and slidable in said guide tracks, said elements having transversely extending lugs adapted to slidably engage said tracks respectively to prevent closing movement of said doors when same are in lowered position within the compartment, each of said guide tracks having a recess at its upper end, said recesses permitting said projecting elements to turn when said doors are in uppermost positions; and braces pivoted on said doors and extendable into said compartment for releasably holding said doors in open positions.

10. In combination with a vehicle body having an upward opening; a pair of closure doors for closing said opening; a compound pivoted hinge having one portion secured to said body and another portion secured to one end of each of said doors whereby said doors are movable in a substantially vertical plane as well as arcuately swingable into adjacent closed position; a guide track secured forwardly of the front portions of each of said doors; projecting elements secured on said doors and slidable in said guide tracks, said projecting elements being pivotable in portions of said track; and sealing elements between the peripheries of said doors and the body edge portions defining said opening.

11. In combination with a vehicle body having an upward opening; a pair of closure doors for closing said opening; a compound pivoted hinge having one portion secured to said body and another portion secured to one end of each of said doors whereby said doors are movable in a substantially vertical plane as well as arcuately swingable into adjacent closed position; a guide track secured forwardly of the front portions of each of said doors; projecting elements secured on said doors and slidable in said guide tracks, said elements having transversely extending lugs adapted to slidably engage said tracks respectively to prevent closing movement of said doors when same are in partly or fully lowered position within the compartment, each of said guide tracks having a recess at its upper end, said recesses permitting said projecting elements to turn when said doors are in uppermost positions; and braces pivoted on said doors and extendable into said compartment for releasably holding said doors in open positions.

JOHN G. APEL.

REFERENCES CITED

The following references are of record in the file of this patent:

UNITED STATES PATENTS

| Number | Name | Date |
|---|---|---|
| 1,481,543 | Eke | Jan. 22, 1924 |
| 1,928,232 | Robinson | Sept. 26, 1933 |
| 2,374,697 | Palisano et al. | May 1, 1945 |